United States Patent [19]

Gary

[11] 3,742,311

[45] June 26, 1973

[54] STATIC ON-DELAY CIRCUIT WITH IMPROVED HOLDING MEANS

[75] Inventor: Wardell Gary, Beaver, Pa.

[73] Assignee: Westinghouse Electric Corporation, Pittsburgh, Pa.

[22] Filed: June 16, 1971

[21] Appl. No.: 153,504

[52] U.S. Cl. .......... 317/141 S, 307/252 W, 307/293, 317/148.5 B

[51] Int. Cl.. H01h 47/18, H01h 47/32, H03k 17/60

[58] Field of Search .................... 307/252 N, 252 F, 307/252 W, 262, 284, 293, 294, 305; 317/141 S, 148.5 B

[56] References Cited

UNITED STATES PATENTS

| | | | |
|---|---|---|---|
| 3,417,296 | 12/1968 | Wallentowitz | 307/293 X |
| 3,417,297 | 12/1968 | Wallentowitz | 307/293 X |
| 3,244,965 | 4/1966 | Gutzwiller | 317/148.5 B |
| 3,584,262 | 6/1971 | Gary | 307/293 X |
| 3,333,175 | 7/1967 | Klyce | 307/252 W X |
| 3,584,263 | 6/1971 | Thompson et al. | 317/148.5 B X |
| 3,435,257 | 3/1969 | Lawrie, Jr. | 307/289 |
| 3,457,433 | 7/1969 | Watson | 317/141 S |
| 3,486,041 | 12/1969 | Thompson | 307/252 W |
| 3,597,662 | 8/1971 | Gary | 317/141 S |

FOREIGN PATENTS OR APPLICATIONS

| | | | |
|---|---|---|---|
| 6,613,739 | 4/1968 | Netherlands | 307/252 W |

*Primary Examiner*—John S. Heyman
*Assistant Examiner*—L. N. Anagnos
*Attorney*—A. T. Stratton and Clement L. McHale

[57] ABSTRACT

A two-terminal transformerless switching circuit adapted to be connected between a load, such as a relay coil, and a source of alternating current. When the switching circuit is energized by connecting it to the source of alternating current through an actuating means, such as a pushbutton switch, energization of the load is delayed by a timing and triggering circuit, the output of which is connected to the gate of a silicon controlled rectifier. The silicon controlled rectifier is connected across the output terminals of a full wave bridge rectifier in such a manner that when it is energized, alternating current will flow into the bridge and through the coil of the relay in sufficient magnitude to energize the relay and complete the switching operation. The complete switching action is delayed for a period of time determined by the charging of a capacitor through a variable resistor network. In addition, a diode array is connected in parallel with an energy storage capacitor 52 so that the capacitor charges to a voltage generally equal to the maximum possible voltage drop across a conducting diode array. When the full wave rectified pulses of current which are applied to the silicon controlled rectifier approach zero the diode array is reverse biased and the capacitor discharges through the then marginally conducting silicon controlled rectifier to sustain conduction in it until sufficient energy from the next half wave of current flows through the silicon controlled rectifier or thyristor. Both the timing and triggering circuits and the holding circuit are initially empowered from the output terminals of the full wave bridge rectifier upon actuation of the timing cycle by closing the previously mentioned pushbutton switch, for example. The amount of current necessary to initially empower these circuits being insufficient to actuate the connected load coil.

5 Claims, 11 Drawing Figures

WITNESSES:
Martin J Moran
H. M. Farkas

INVENTOR
Wardell Gary
BY
Clement L McHale
ATTORNEY

PATENTED JUN 26 1973

3,742,311

STATIC ON-DELAY CIRCUIT WITH IMPROVED HOLDING MEANS

CROSS REFERENCE TO RELATED APPLICATIONS

This invention is related to copending application Transformerless Solid State On-Delay Timer, Ser. No. 732,721, filed May 28, 1968 by F. T. Thompson and Wardell Gary.

BACKGROUND OF THE INVENTION

This invention relates to time delay circuits and it has particular relationship to two-terminal, transformerless, semiconductor on-time delay circuits used for energizing relay coils from a source of alternating current.

In certain types of time delay circuits such as the type disclosed in U.S. Pat. No. 3,486,041 a transformer is used with a source of power to help control a time delay switch. However this type of circuit necessitates, in many cases, the use of four external terminals, two of which are primary terminals of a power input transformer and two of which are output or central terminals connected to the associated load to be controlled by the switch. In another type of time delay switching circuit, such as that disclosed in U.S. Pat. No. 3,244,965, a silicon controlled rectifier or thyristor is used to conduct alternating current through a load. However, in order to retain the silicon controlled rectifier in its conducting state in the latter type of circuit, the silicon controlled rectifier is retriggered every half cycle of electrical power. In another type of electrical circuit such as disclosed in U.S. Pat. No. 3,417,297 a silicon controlled rectifier is retained in a conducting state after the alternating current flowing in its anode-to-cathode path has been reduced to near zero each half cycle by the discharge of an unregulated capacitor through the silicon controlled rectifier, thus sustaining the silicon controlled rectifier in a conducting state. However, the capacitor is primarily a filter capacitor which is initially charged in parallel with the silicon controlled rectifier and not in series with it so that if the capacitor shorts out, the load may be inadvertently energized as soon as the timing cycle is started.

SUMMARY OF THE INVENTION

In accordance with the invention, a transformerless, two terminal timing circuit which is of the on-delay variety and which is adapted to be serially connected to an associated load is disclosed. The timing circuit uses a capacitor and an adjustable series resistance element to control the voltage across a complementary pair of transistors such that at a predetermined time after an actuating switch which connects a source of alternating current to a bridge network has been closed, the complementary pair of transistors provide a triggering signal to the gate of a silicon controlled rectifier which then connects the previously mentioned load or relay coil to the source of alternating current. Prior to this but after the source of alternating current has been connected to the bridge by the previously mentioned switch, a small amount of electrical current insufficient to adequately energize the load or relay coil is supplied to the bridge where it is converted to pulsating unidirectional current. This pulsating unidirectional current is used to partially charge a holding capacitor which is connected in parallel with an array of diodes comprising, for example six diodes, such that the voltage across the capacitor will in effect be regulated or maintained at substantially a predetermined value equivalent to the voltage drop across the six fully conducting diodes. The holding capacitor is fully charged when the SCR is turned on. Concurrently with this, the previously mentioned resistive-capacitive network starts to charge. After it has charged to a predetermined value, the triggering circuit actuates the silicon controlled rectifier whereby the load is energized completely through the then conducting silicon controlled rectifier. Each half cycle, as the pulsating alternating current approaches zero, the silicon controlled rectifier would normally be turned off. The energy storage or holding capacitor, however, which is connected in parallel with the previously mentioned diode array discharges through the silicon controlled rectifier supplying electrical current to it. The controlled rectifier is thus maintained in a generally continuously conducting state until the next half cycle of unidirectional pulsating current rises to a value sufficient to maintain the silicon controlled rectifier or thyristor in its conducting state without the aid of the storage or holding capacitor. In addition, should an event occur which interrupts the timing cycle prematurely, discharge circuits are provided whereby the previously mentioned timing capacitor may be quickly discharged thus resetting the on-delay timing circuit for subsequent actuation. In addition, the holding capacitor is charged virtually in series with the silicon controlled rectifier. Consequently, if it shorts, the load need not inadvertently be energized.

BRIEF DESCRIPTION OF THE DRAWINGS

For a better understanding of the invention, reference may be had to the preferred embodiment, exemplary of the invention shown in the accompanying drawings, in which.

DESCRIPTION OF THE PREFERRED EMBODIMENT

Figures 1, 1A:
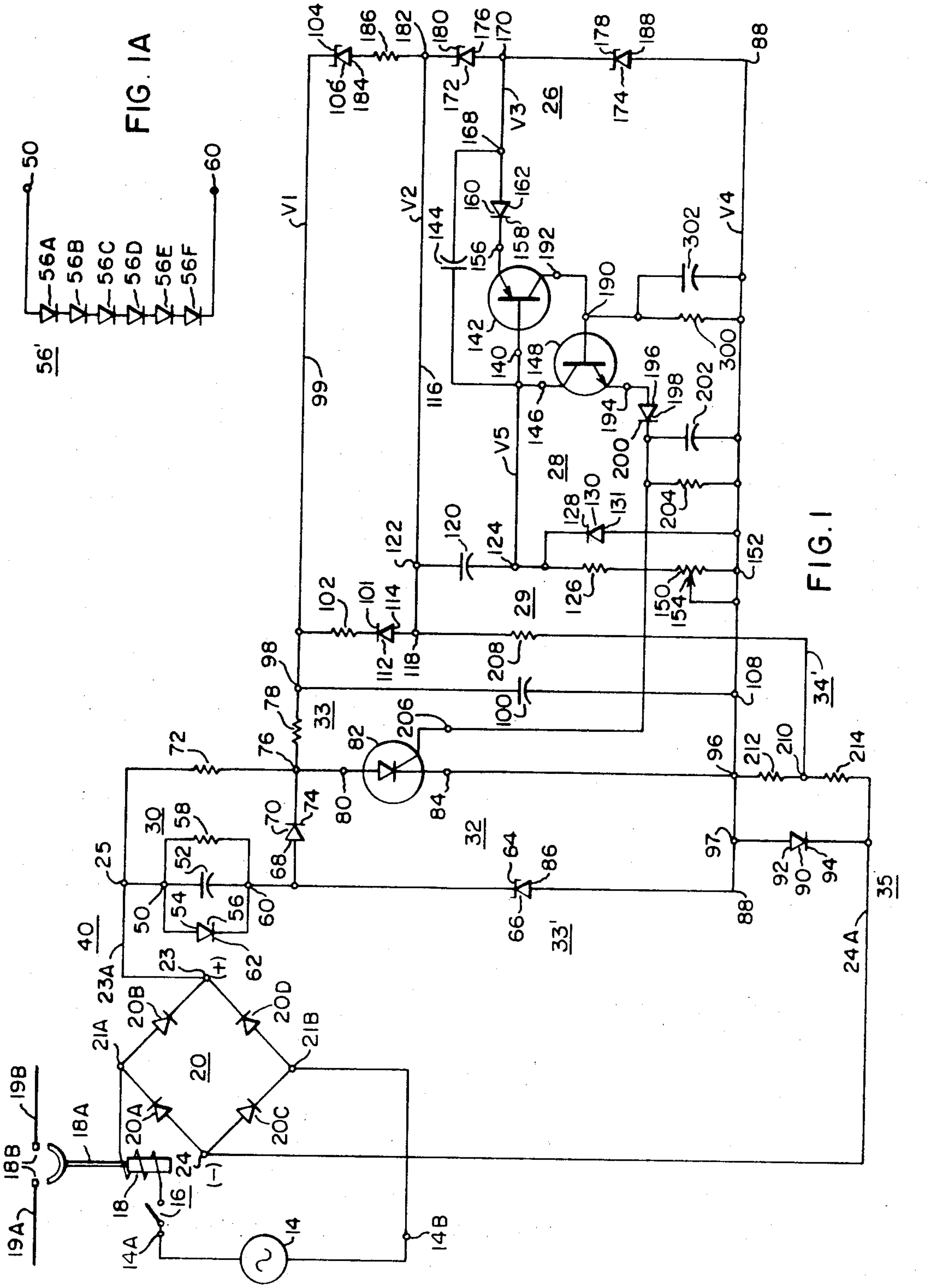
FIG. 1 is a circuit schematic of the on-time delay circuit including load relay coil and source of voltage.
FIG. 1A is a circuit schematic diagram of the diode array which is used in conjunction with current storage capacitor (also shown in FIG. 1)

Referring now to the drawings, and FIG. 1 in particular, a schematic diagram for a two-terminal transformerless on-time delay circuit 40 is shown. A source of alternating or pulsating electrical current 14 is connected to the two external terminals 14A and 14B of the on-time delay circuit 40. A suitable energizing means 16, such as a switch, may be connected to either terminal 14A or 14B and the source of alternating current 14. The closing of switch 16 begins the on-delay interval which subsequently results in the energization of load or relay coil 18, whereupon relay coil 18 is subsequently fully energized, or movable armature 18A moves upwardly to close the circuit between terminals 18B of electrical circuits 19A and 19B thus energizing external electrical means at a predetermined time after switch 16 has been closed. Full wave bridge recitifer circuit 20 which may have diode elements or unidirectional electrical values 20A, 20B, 20C and 20D is connected to the load 18, the switch 16 and the source of alternating current 14 at terminals 21A and 21B. This circuit arrangement provides a source of pulsating unidirectional current at terminals 23 and 24 of full wave bridge rectifier means 20, terminal 23 generally being the more positive electrical terminal of the bridge network 20 and terminal 24 being the more negative electrical terminal. Terminal 23 supplies an electrical bus or conductor 23A with electrical power which is used to supply positive pulsating current to other parts of the on-delay timing means 40. Terminal 24 is connected to a negative bus or conductor 24A which is used as a return path for electrical current from parts of the time delay means 40.

Bus 23A is connected to a junction point 25 which is the electrical junction point of a plurality of components in the time delay circuit 40, one of which is a parallel arrangement of circuit elements forming a charge storage and current maintaining means 30. Junction point 50 which is electrically connected to the junction point 25 is connected in turn to one side of a first capacitor 52, the anode 54 of a first diode array 56 and a first resistor or resistive element 58. Resistor 58 and the other side of capacitor 52 are connected to a junction point 60 to which is also connected a cathode 62 of diode array 56. It will be noted that the diode array is represented by one diode 56.

Referring to FIG. 1A, a diode array 56′ comprising six diodes 56A, 56B, 56C, 56D, 56E and 56F are shown connected in series between terminals 50 and 60, these terminals being the same as terminals 50 and 60 as shown in FIG. 1.

Referring again to FIG. 1, it can be seen that junction point 60 is connected to the regulating or positive end 64 of a first Zener diode or voltage limiting means 66. Junction point 60 is also connected to the anode 68 of a second diode or voltage limiting means 70. One end of resistor or resistive element 72 is connected to junction point 25 and the other end is connected along with cathode 74 of diode 70 to a common junction point 76. Junction point 76 is, in turn, connected to a third resistor or resistive means 78 and to the anode 80 of a first silicon controlled rectifier or thyristor or similar gated static device or gated electrical valve 82. The cathode 84 of the gated valve 82 is connected to a common electrical bus 88. Also connected to common bus 88 is a diode or unidirectional gated valve 90 having its anode 92 connected to common bus 88 at junction point 97 and its cathode 94 connected to the negative power supply bus 24A.

Silicon controlled rectifier 82 forms part of a gated switching network 32 and diode 90 forms part of a voltage divider network 34′. The cathode 84 of the thyristor 82 is connected to the common bus 88 at junction point 96. Resistor 78 is connected at its other end to junction point 98. Junction point 98 is in turn connected to a capacitor or capacitive element 100. Junction point 98 is also connected to one end of a resistive element or resistor 102 and by way of bus 99 to the regulating or positive terminal 104 of the second Zener diode 106. When Zener diode 106 conducts substantial electrical current, voltage VI appears on electrical bus or conductor 99.

Capacitor 100 forms part of a voltage transient suppressor means 33 and also part of voltage regulator means 26. Connected to the other end of the resistive element or resistor 102 is a diode or unidirectional electrical valve 112 having cathode 101 and anode 114. Connected to anode 114 is an electrical junction terminal 118. Also connected to junction terminal 118 is a similar junction terminal 122. Connected to junction terminal 122 is a timing capacitor or capacitive element 120. Connected to the other end of capacitive element or capacitor 120 is junction point or terminal 124 to which is connected one end of a resistive element or resistor 126 and the cathode 128 of a diode or unidirectional electrical valve 130. The anode 131 of diode 130 is connected to previously mentioned electrical bus conductor 88. Bus 88 is maintained at an electrical voltage V4. Junction point 124 is generally maintained at an electrical voltage V5 which may vary depending upon the electrical charge on capacitor 120. Capacitor 120 charges through resistor 126 and an associated resistive element or potentiometer or variable resistive element 150 having a movable tapping element 154. Resistive element or resistor 150 is connected at junction point 152 to common bus 88.

Also connected to junction point 124 is a switch triggering means 28. Switch triggering means 28 comprises a first three element gated valve or semiconductor transistor 142 having first input terminal or emitter 156, base or control terminal 140 and collector or output terminal 192. The collector or output terminal 192 of the first static gated device 128 is connected to base 190 or control element of a second static device or semiconductor transistor 148. Noise suppression resistor and capacitor 300 and 302 respectively are connected between base terminal 190 and bus 88. The collector terminal 146 of transistor 148 is connected to the base 140 of the first transistor 142 and also to one side of a capacitor or capacitive element 144. The other side of capacitor 144 is connected to junction point 168 which is substantially the same as junction point 170. Connected between junction point 168 and emitter or input terminal 156 of first transistor 142 is a diode or unidirectional electrical valve 160 having its cathode 158 connected to the emitter terminal 156 and its anode 162 connected to junction point 168.

Junction point 168, as previously mentioned, may be connected to junction point 170 of voltage regulator means 26. Junction point 170 may be maintained at a relatively constant or predetermined voltage V3. voltage regulator 26 comprises the previously mentioned Zener diode 106, the anode 184 of which is connected to a resistive element 186. Resistive element 186 is connected at one end to a junction point 182 and to the regulating or positive terminal 180 of a third regulating means or Zener diode 172. The anode 176 of Zener diode 172 is connected to junction point 170 which, as was mentioned previously, may supply a relatively constant or predetermined voltage V3 to portions of the on-delay timing means circuitry 40. Junction point 170 is connected to a fourth voltage regulating means 174 at the regulating terminal or Zener diode cathode 178. The anode 188 of the Zener diode 174 is connected to the common bus 88 and is maintained at substantially a voltage V4.

The emitter 194 of the static device or NPN transistor 148 is connected to the anode 196 of a diode or unidirectional electrical valve 198. The cathode 200 of diode 198 is connected concurrently to one side of a capacitor or capacitive element 202 and to one terminal of a resistive element or resistor 204 and to the gate 206 of the previously mentioned thyristor or gated control element 82. The other end or side of capacitor 202 is connected to the common electrical bus 88 as is the other end of resistor 204.

Also connected to junction point 118 and to the anode 114 of diode 112 is one end of a resistive element or resistor 208, the other end of which is connected to a voltage divider junction 210 of voltage divider 35 through discharge path 34'. Voltage divider junction 210 comprises the junction between one end of resistive element or resistor 212 and one end of another resistive element or resistor 214 with the other end of resistive element 212 being connected at junction point 96 to the common bus 88. The other end of resistor 214 is connected to the common bus 24A of power supply or bridge 20.

Figures 2, 3, 4, 5:
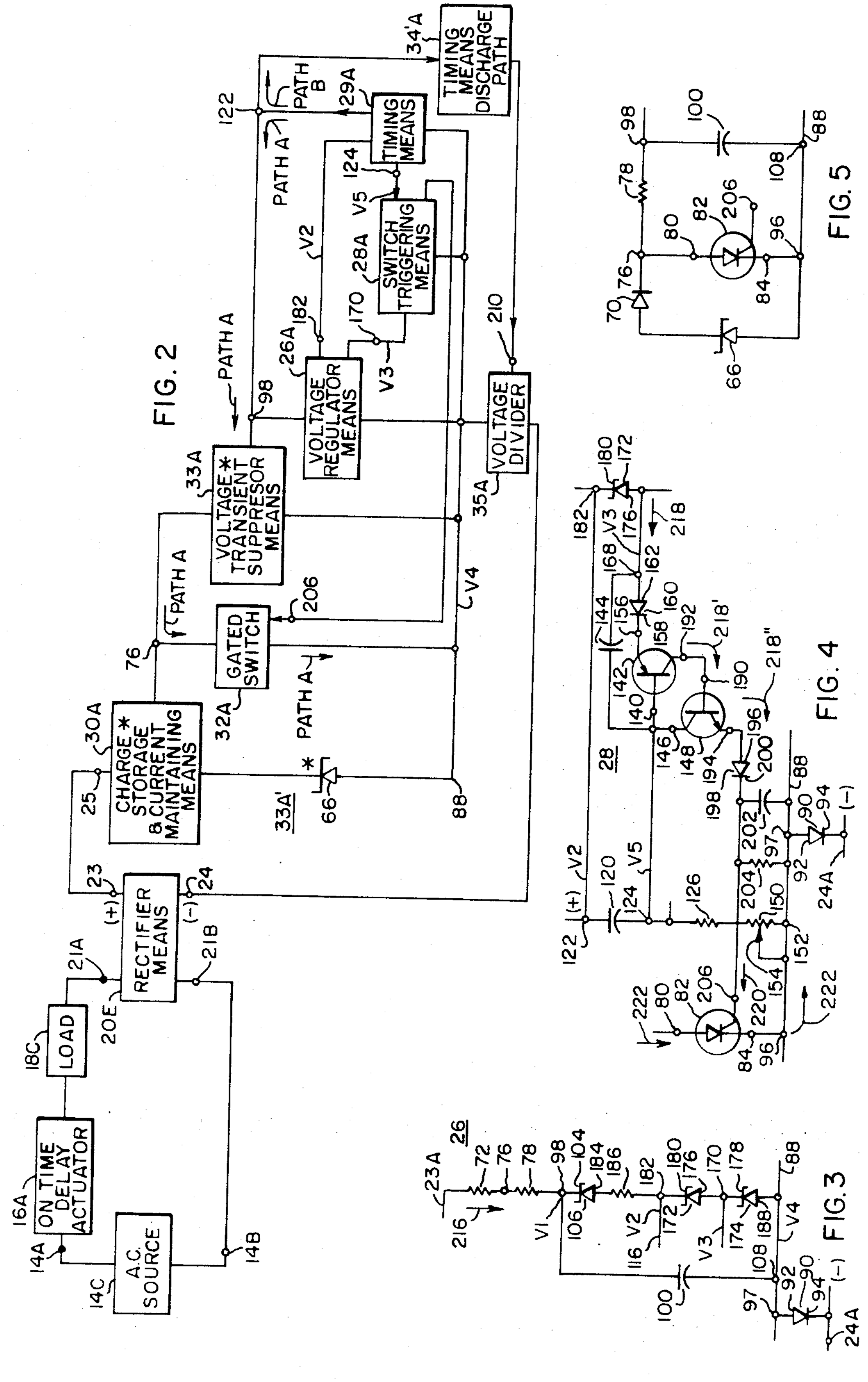
FIG. 2 is a functional block diagram of the on-time delay circuit shown in FIG. 1.
FIG. 3 is a circuit schematic diagram of the voltage regulator which forms part of the circuit of FIG. 1.
FIG. 4 is a circuit schematic diagram of the timing and triggering circuits shown in FIG. 1.
FIG. 5 is a circuit schematic diagram of the noise suppression network used with the thyristor as shown in FIG. 1.

Referring now to FIG. 2, a functional block diagram of the on-time delay means 40 shown schematically in FIG. 1 is shown. It will be noted that the various circuit portions described in FIG. 1 are segregated into identifiable functional means or blocks and identified by reference numbers which are similar to those used in the description of the same circuits or groups of elements in FIG. 1. It will be noted that an alternating current (A.C.) source of varying voltage 14C is shown connected to terminals 14A and 14B. In this embodiment of the invention, the on-time delay actuator or switch 16A is shown connected at one end to terminal 14A and at the other end to the load 18C. Load 18C is in turn shown connected at its other end to terminal 21A of rectifier means 20E. The other terminal 21B of rectifier means 20E is returned to the A.C. source 14C at terminal 14B. The positive terminal 23 of rectifier means 20E is shown connected to junction point or terminal 25. Also connected to terminal 25 is the charge storage and current maintaining means 30A. Charge storage and current maintaining means 30A is connected through Zener diode 66 to common electrical bus 88 which is in turn maintained at a substantially constant voltage V4. Zener diode 66 also serves as a transient voltage spike limiter. Charge storage and current maintaining means 30A has a third terminal 76 connected to a gated switch 32A and to a voltage transient suppressor means 33A. The other terminals of both gated switch 32A and voltage transient suppressor means 33A are connected to common bus 88. It will be noted that Zener diode 66 also shown as means 33A' in FIG. 2 is a common element to both the voltage transient suppressor means 33A and charge storage and current maintaining means 30A. The voltage transient suppressor means 33A also has a third terminal 98 which is connected to a voltage regulator means 26A. The other terminal of voltage regulator means 26A is also connected to common bus 88. Also connected to terminal 98 is one input lead of a timing means 29A and one input lead of a timing means discharge path 34A'. Timing means 29A also has one terminal connected to common bus or lead 88.

Interposed electrically and functionally between timing means 29A and voltage regulator means 26A is a switch triggering means 28A. Switch triggering means 28A is connected to voltage regulator means 26A at terminal 170 which is generally maintained at the relatively fixed stable voltage V3. Switch triggering means 28A is connected to timing means 29A at terminal 124 which may be maintained at the time variable voltage V5. Switch triggering means 28A is also connected to terminal or gate 206 of gated switch 32A. It will be noted that the other terminal of the timing means discharge path 34A' is connected at junction point 210 of a voltage divider means 35A. One side of voltage divider means 35A or one lead of voltage divider means 35A is connected to common bus 88 and the other end or other terminal of voltage divider means 35A is returned to the rectifier means 20E at negative terminal 24.

In operation, upon the actuation of the time delay actuator 16A, the alternating current source 14C supplies a limited amount of current through load 18C to the rectifier means 20E. The current through load 18C is insufficient to adequately energize load 18C. However, the current flowing through rectifier means 20E provides pulsating alternating current, which may be sinusoidally shaped, at positive terminal 23 and negative terminal 24 of rectifier means 20E. This pulsating current is supplied to partially charge energy storage and current maintaining means 30A; note means 30A is fully charged during conduction of gated switch 32A. In the latter means some of the energy from this pulsating current is stored for future use, and some of the current is diverted to the voltage transient suppressor means 33A which is used to prevent the energization of gated switch 32A from extraneous noise or voltage transients existing in the physical vicinity of gated switch 32A. Voltage transient suppressor means 33A comprises a capacitor 100 as shown in FIG. 1 which acts also as part of voltage regulator means 26A. The current flowing into the voltage regulator means 26A is sufficient to provide regulated voltages V2 and V3. The timing means 29A is also energized by current flowing out of the storage capacitor 100 in voltage transient suppressor means 33A.

Upon initial energization, timing means 29A impresses an instantaneous voltage V5 at junction 124 which begins to decay until the switching potential of switch triggering means 28A is reached. This switch triggering potential is determined by the generally fixed or regulated voltage V3. Once switch triggering means 28A has been triggered, it provides a pulse to terminal 206 which causes gated switch 32A to conduct thus substantially shorting out elements of the overall circuit to the right of gated switch 32A and resetting the timing circuit 29A for subsequent on-time delay operations. An exception is the voltage divider 35A which is not shorted out by the conduction of gated switch 32A nor is timing means discharge path 34A'.

Upon energization, pulsating unidirectional current is imposed at terminal 76. As each cycle of this pulsating unidirectional current approaches zero the gated switch 32A may have a tendency to turn off or cease to conduct. However, at this point, charge storage and current maintaining means 30A supplies sufficient current to junction point 76 to maintain gated switch 32A in a conducting state thus maintaining a substantially closed electrical circuit which extends between AC source terminal 14C, closed on-time actuator switch 16A, load 18C, terminal 21A of rectifier means 20E, terminal 23 of rectifier means 20E, the charge storage and current maintaining means 30A, the gated switch 32A, the voltage divider means 35A, negative terminal 24 of rectifier means 20E and alternating current terminal 21B of rectifier means 20E and finally terminal 14B of alternating current source 14C, thus continually energizing load 18C. Upon the shorting out of timing means 29A, as was previously described, current which had previously been stored in timing capacitor 120 as shown in FIG. 1 discharges initially along path A through voltage transient suppressor means 33A and gated switch 32A to bus 88. The final portion of discharge of the capacitor 120 is along path B through timing means discharge path 34A' and into voltage divider 35A. This allows complete discharge of timing means 29A to zero voltage to provide a timing accuracy of nearly one percent.

In order to fully understand the operation of the schematic diagram shown in FIG. 1 which corresponds to the functional block diagram shown in FIG. 2, the different circuit portions of FIG. 1 have been shown separately in FIGS. 3 through 6 for ease in understanding of the various functional elements of switch system 40.

FIG. 3 shows a voltage regulator means such as 26A shown in FIG. 2. In this case, current 216 flows from the rectifier means 20 (not shown) into bus lead 23A through resistor 72, resistor 78 and into three serially connected Zener diodes 106, 172 and 174 with a resistor 186 interposed between the Zener diode 106 and Zener diode 172. Capacitor 100 is shown connected between common voltage bus 88 and junction point 98. Current 216 is returned to terminal 24 of rectifier means 20 through diode 90 and bus 24A. As current 216 flows through voltage regulator means 26, three relatively stable or regulated voltages V2, V3 and V4 are established at junction points 182, 170 and bus 88 respectively. Voltage V1 and junction 98 are not well regulated. It will be noted that current 216 at bus 23A is pulsating and therefore approaches zero every half cycle. Normally, this would cause Zener diodes 104, 176 and 178 to turn off or cease to regulate once every half cycle. However current 216 initially charges capacitor 100 which returns current or charge to Zener diodes 106, 172 and 174 when current 216 approaches zero thus maintaining Zener diodes 106, 172 and 174 in a conducting or regulating state and maintaining voltages V2, V3 and V4 at relatively fixed and stable predetermined reference values. This occurs when on-time delay actuator or switch 16A as shown in FIG. 2, which is shown as switch 16 in FIG. 1 is closed.

Referring now to FIG. 4, those portions of FIG. 1 comprising the timing means 29, switch triggering means 28 and the gated switch 32 are shown in schematic form. In this instance, as soon as the regulated, relatively stable voltage V2 appears at junction 122, the voltage V5 at junction point 124 becomes highly positive. Since voltage V3 becomes substantially less than voltage V5, diode 160 and the emitter-to-base junction 156-to-140 of transistor 142 become reversed biased so that substantially low or negligible current flows through this path. As a result, the voltage between the base 190 and the emitter 194 of transistor 148 and the current into the base 190 of transistor 148 are insufficient to cause transistor 148 to conduct. However, as capacitor 120 begins to charge through resistor 126 and that part of resistive element 150 which is not shorted to bus 88 by movable terminal 154, variable voltage V5 begins to again become more negative in value. Subsequently, voltage V5 reaches a value where the base 140 of transistor 142 is sufficiently lower in voltage value than the emitter 156, consequently causing transistor 142 and diode 160 to conduct, drawing current 218 through diode 160 and the emitter-to-collector circuit of transistor 142. The current 218' which then flows out of the collector 192 of transistor 142 is substantially equal to or the same as current 218. At this point, the current 218' flowing into base 190 of transistor 148 is sufficient to cause transistor 148 to conduct electrical current from its collector 146 to its emitter 194. This, in turn, essentially shorts out the collector-to-emitter (146-to-194) circuit of transistor 148 and lowers the voltage on base 140 of transistor 142 further. Consequently, a significant amount of current 218'' flows through the fully biased diode 198. A portion of current 218'' is shunted through resistor 204 but a significant amount of current 220 is supplied to the gate 206 of silicon controlled rectifier or thyristor 82 causing thyristor 82 to conduct from its anode 80 to its cathode 84 so that relay load current 222 flows. Current 222 flows to junction point 96 and through diode 90 to the negative bus 24A of the full wave rectifier bridge 20. Current 222 substantially energizes load 18C causing coil 18, as shown in FIG. 1 to be energized and armature 18A to move to the closed position.

Referring now to FIG. 5, a voltage transient suppressor means 33 is shown comprising a resistor 78, a diode 70, a Zener diode 66 and a capacitor 100, which as will be remembered also is instrumental in maintaining the voltage regulating operation of voltage regulator means 26A as shown in FIG. 3. In addition Zener diode 66 forms part of the holding current 224 loop as will be seen in FIG. 7. These components are connected between junctions 96 and 76 or between the anode 80 and cathode 84 of the silicon controlled rectifier or thyristor 82. Consequently, any extraneous pulses of high frequency anode current which may exist or occur due to noise or transient pickup are shunted through the series combination of resistor 78 and capacitor 100. This combination also prevents a high rate of anode voltage rise ($dv/dt$) from triggering SCR82 into the conducting state.

Figures 6, 7, 8, 9, 10:
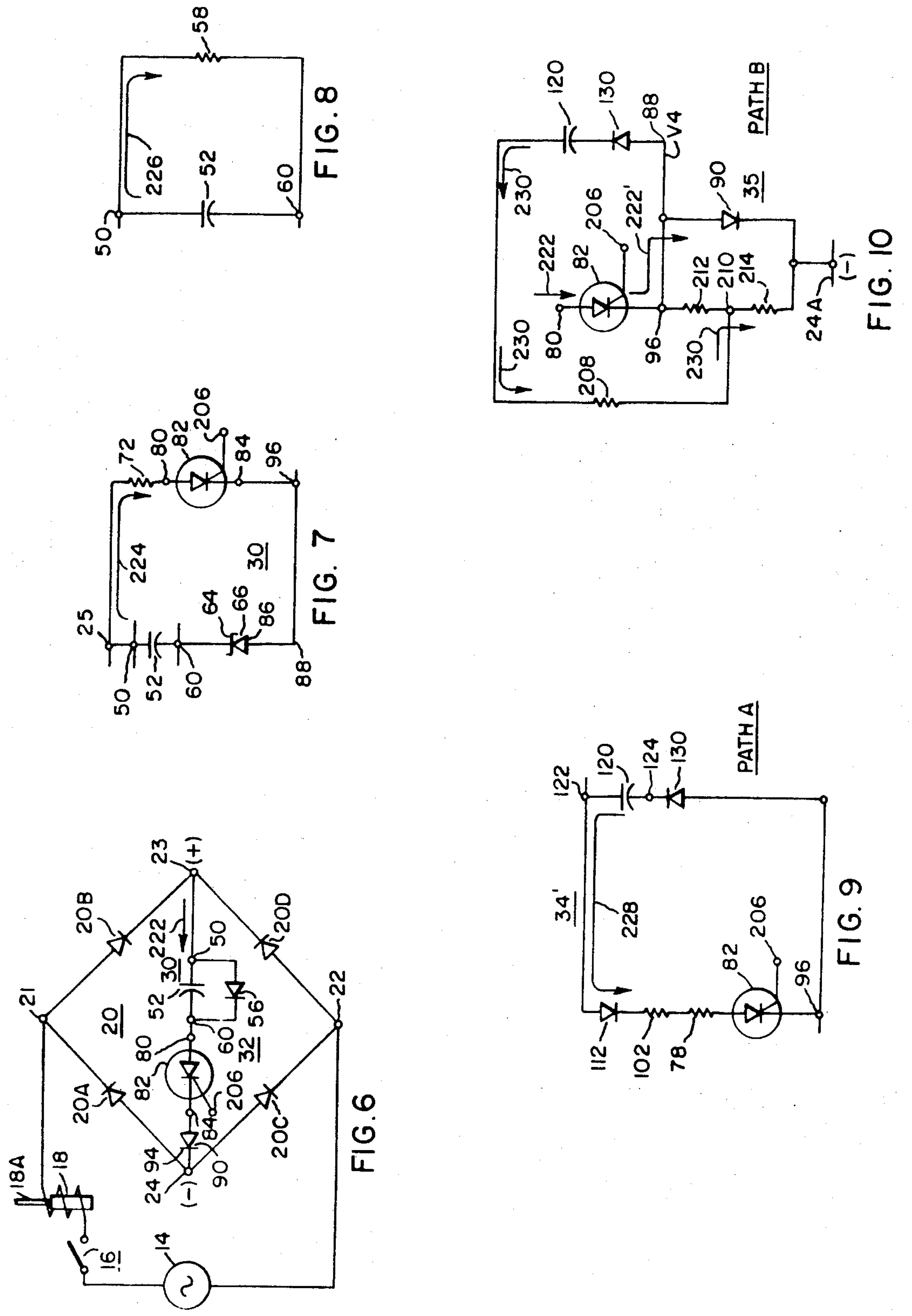
FIG. 6 is a circuit schematic diagram of the load circuit and charge storage and current maintaining means charging path which forms part of the circuit shown in FIG. 1.
FIG. 7 is a circuit schematic diagram of the charge storage and current maintaining means discharging path as also shown in FIG. 1.
FIG. 8 is a circuit schematic diagram of a quick discharge path for the storage capacitor in the charge storage and current maintaining means as also shown in FIG. 1.
FIG. 9 is a circuit schematic diagram of the discharge or reset path A for the timing capacitor network as also shown in FIG. 1.
FIG. 10 shows a circuit schematic circuit diagram of the reset or discharge path B for the timing capacitor as also shown in FIG. 1.

Referring now to FIG. 6, which is a schematic diagram of the load circuit and the charge storage and current maintaining means 30A, current 222 which was also shown in FIG. 4 is shown flowing through the parallel combination of capacitor 52 and diode 56 or equivalent diode array 56'. It will be noted that the resistor 58 which is also connected between the junction points 60 and 50 as shown in FIG. 1 is not shown in FIG. 6 because the amount of current flowing in it is insignificant compared with the current flowing through capacitor 52 and diode 56. Current 222 also flows through silicon controlled rectifier or thyristor 82 and diode 90 as previously described. As a portion of current 222 flows through the diode or diode array 56 the voltage drop across capacitor 52 is limited by the forward voltage drop of the diode 56 or equivalent diode array 56'. It will be remembered that diode array 56' as shown in FIG. 1A may comprise a plurality of six diodes and therefore six forward bias voltage diode drops are impressed across capacitor 52.

Referring now to FIG. 7 it will be remembered that current 222, as shown in FIGS. 4 and 6 represents a pulsating unidirectional current which approaches zero once every half cycle. When this happens, silicon controlled rectifier 82 tends to turn off or cease to conduct. When current 222 is near zero, the diode 70 as shown in FIG. 1 becomes reverse biased and substantially nonconducting. Consequently, the charge which is stored in capacitor 52 flows from junction 50 to terminal or junction point 25, through resistor 72, into the anode 80 of the silicon controlled rectifier 82 and out of the cathode 84 and into the voltage regulating means or Zener diode 66. The discharge time is controlled or determined by the capacitance of capacitor 52 and the resistance of resistor 72. The discharge time may be made sufficiently long such that current 222, as shown in FIG. 6, will return or increase to a suitable maintaining value for thyristor 82 before capacitor 52 completely discharges. Of course, once current 222 has reached this value, capacitor 52 begins to recharge from a portion of the current 222.

Referring now to FIG. 8, a quick discharge path for energy storage and current maintaining capacitor 52 is shown. In some instances or operating conditions, it is necessary to quickly discharge capacitor 52 through a path other than one which contains the thyristor or silicon controlled rectifier 82. Were it not for the resistor 58, the charged capacitor 52 would not be able to discharge in the event silicon controlled rectifier 82 or thyristor 82 became substantially non-conducting or open. However, resistor 58 provides a return path for current 226 such that capacitor 52 may discharge regardless of the status or operating condition of thyristor 82.

Referring now to FIG. 9, a discharge path A for timing capacitor 120 is shown. After actuation of gated switch 82, it is necessary to quickly discharge capacitor 120 so that the timing circuit 29A may be reset for a subsequent actuation or operation. In this case, the charge at the positive terminal of capacitor 120 is discharged in the form of a current 228 through diode 112, resistor 102, resistor 78, conducting silicon controlled rectifier or thyristor 82 and diode 130 to the negative terminal 124 or junction point of capacitor 120.

Referring now to FIG. 10, an alternate method for removing electrical charge in the form of discharge current from capacitor 120 is shown. This path may be used in conjunction with path A or, alternatively, depending upon operating conditions in other parts of the circuit such as termination of the timing cycle before actuation of switch 82. Generally, discharge path B is effective when the current flowing from capacitor 120 is so low that diode 112 is no longer forward biased or thyristor 82 has inadvertently become nonconducting. Presuming however that thyristor 82 has not become nonconducting and that current 222' which is substantially equal to the load current 222, as shown in FIG. 4, still flows, a voltage drop exists between terminal 96 and negative bus 24A equal to the voltage drop across conducting diode 90. This voltage drop is imposed across a resistor voltage divider network comprised of resistor 212 and resistor 214. In this situation, current 230 flows from the positive side or plate of capacitor 120 through resetting or discharge resistor 208 to the junction point 210 between resistors 212 and 214. Junction point 210 will be slightly negative with respect to voltage V4 at bus 88, consequently allowing discharge current 230 to flow even though the voltage drop across capacitor 120 is nearly zero.

It will be noted that the on-time delay circuit 40 as shown in FIG. 1 may be reset either by providing a conducting path between the output terminals 23 and 24 of the bridge network 20 or by interrupting the input power such as by opening switch 16.

It is to be understood that the load 18 such as shown in FIG. 1 or 18C such as shown in FIG. 2 need not necessarily be a relay coil but may be any load means which is sought to be energized, a period of time after the start of the energizing cycle. It is also to be understood that instead of the complementary pair of transistors 142 and 148 a single programmable unijunction transistor (PUT) where desired may be employed. It is also to be understood that the semiconductor devices and means, such as thyristor 82 and the associated diodes and transistors may be replaced by suitable equivalent vacuum tube devices, such as triodes, thyratrons and diode tubes. It is also to be understood that the pulsating source of alternating current need not be sinusoidally shaped but may be any source of alternating current regardless of wave shape. The current may also be direct current. It is also to be understood that the diode array 56' need not be limited to six diodes as shown in FIG. 1A but may include any number of diodes as required in a particular application. It is also to be understood that the on-time delay actuator 16A need not necessarily be a single pole, single throw switch such as indicated at 16 in FIG. 1 but may be any type of circuit closing apparatus such as a set of relay contacts. It is also to be understood that the two terminal timer may be converted to a three terminal timer.

The apparatus embodying the teachings of this invention has several advantages. Primarily it is a two-terminal network, that is, only two external terminals need be connected to an external load switch such as 16 or 16C and source of power 14. In addition, the use of discharge path A and discharge path B provides for a quick reset of the timing circuit so that an on-delay timer circuit 40 as disclosed may be reactuated subsequently a very short time after it has been deactuated. In addition, no transformers with heavy magnetic cores are required and the semiconductor elements are sufficiently small so that the entire timing circuit may be housed in a very small package and mounted adjacent or tandem to a relay, the actuation of which is to be delayed. In addition the timing inaccuracy is reduced to approximately one percent deviation from the desired value.

I claim as my invention:

1. An on-delay timing apparatus for fully energizing an electrical relay coil at a predetermined time after the apparatus is connected to an alternating current voltage source comprising a rectifier means adapted to be connected to said source, a charge storage and electrical current maintaining means connected to said rectifier means, a gated switch having an actuating terminal and main terminals, said main terminals being connected in series circuit relation with said rectifier means and said electrical current maintaining means, said rectifier means providing an electrical path for pulsating electrical current from said source to energize said electrical relay coil periodically through said gated switch and through said charge storage and current maintaining means when said gated switch is in a conducting state, said storage and current maintaining means being adapted to store some of the electrical energy flowing from said rectifier means when said rectifier means is connected to said source, a voltage transient suppressor means connected to the main terminals of said gated switch to prevent the actuation of said gated switch to a conducting state by means other than the energization of said gated switch actuating terminal, a voltage regulator means, timing means, a switch triggering means including two input terminals, and an output terminal, said voltage regulator means being connected to said switch triggering means to provide substantially a predetermined voltage to one input terminal of said switch triggering means, said timing means being connected to said switch triggering means to provide a variable voltage to the other input terminal of said switch triggering means, said switch triggering means being responsive to provide an energizing signal at said output terminal to said actuating terminal of said gated switch to thereby actuate said gated switch to a conducting state and energize said electrical coil when said variable voltage reaches a predetermined more negative value relative to an initial value of said predetermined voltage, which occurs a predetermined time after said apparatus is connected to said source of alternating current, and means connected in circuit relation with said timing means for providing a discharge path for said timing means during certain operating conditions, said discharge path assisting in the resetting of said timing means by providing an electrically conducting path for removing electrical charge from said timing means, said charge storage and current maintaining means supplying sustaining electrical current to said gated switch after said switch has been actuated to a conducting state to prevent said gated switch from becoming nonconducting and deenergizing said electric coil when said pulsating electrical current approaches a zero value for reasons other than the disconnecting of said load from said alternating current source.

2. The combination as claimed in claim 1, wherein said rectifier means comprises a full wave bridge type rectifier circuit, said pulsating electrical current comprises full wave rectified sinusoidally shaped electrical current pulses, said gated switch comprises a gated electrical valve having an anode, cathode and a gate, said anode and said cathode comprising said main terminals said charge storage and current maintaining means being capable of supplying electrical current to said gated electrical valve through said anode and said cathode when said electrical pulses are near zero current value to maintain said gated valve in a conducting state, said voltage transient suppressor means being electrically connected to said anode and said cathode to absorb electrical energy which may be impressed across said anode and said cathode before said gate is energized, a voltage divider, said transient suppressor means and said closed gated electrical valve forming a first current conducting discharge path in said means for forming a discharge path for said timing means, said voltage divider means forming a second current conducting discharge path in said means for forming a discharge path for said timing means.

3. The combination as claimed in claim 2 wherein said gated electrical valve comprises a static gated device, said static gated device being actuated to a conductive condition by the presence of said triggering signal on said gate and said static gated device thereafter being substantially nonconducting during the absence of substantial electrical current flowing from said anode to said cathode of said static gated valve.

4. The combination as claimed in claim 3 wherein said charge storage and current maintaining means comprises a first diode array and a second diode, said first diode array and said second diode having respective anode and cathode terminals, a first voltage limiting means capable of conducting electrical current at a substantially predetermined voltage drop, said first voltage limiting means having first and second terminals, first and second resistive elements, a first capacitive element having two terminals, said full wave bridge rectifier having a positive and a negative output terminal and two input terminals capable of being connected to said electrical relay coil and said source of alternating current, said anode terminal of said first diode array, one of said terminals of said first capacitive element and one terminal each of said first and second resistive elements being electrically connected to said positive output terminal of said full wave bridge rectifier, the other terminal of said first capacitive element, the cathode terminal of said first diode array, and the other terminal of said first resistive element being electrically connected to the anode terminal of said second diode and to said first terminal of said first voltage limiting means, the cathode terminal of said second diode being electrically connected to the other terminal of said second resistive element, a third diode, said third diode having a cathode terminal and an anode terminal, said second terminal of said first voltage limiting means being connected to the anode terminal of said third diode, the cathode terminal of said third diode being connected to said negative output terminal of said full wave bridge rectifier, the anode of said static gated device being connected to said cathode of said second diode and to said other terminal of said second resistive element, the cathode of said static gated device being connected to the anode of said third diode, said voltage transient suppressor means comprises a third resistive element, said first voltage limiting means, and a second capacitive element having two terminals, one end of said third resistive element being connected to the cathode of said second diode, to said other terminal of said second resistive element and to said anode of said static gated device, the other end of said third resistive element being connected to one terminal of said second capacitive element, the other terminal of said second capacitive element being connected to said anode of said third diode, said first voltage limiting means having a cathode and an anode, said anode being connected to the anode of said third diode, said cathode being connected to the anode of said second diode, said voltage regulator means comprising second, third and fourth voltage limiting means each adapted to conduct electrical current with a substantially predetermined voltage drop, said second, third and fourth voltage limiting means each having a first and a second terminal, a fourth resistive element, said fourth resistive element and said second voltage limiting means being connected in series circuit relationship, the latter series circuit being connected at one end to junction point of one terminal of said third resistive means and one terminal of said second capacitive means, the other end of the latter series circuit being connected to the first terminal of said third voltage limiting means such that the second terminal of said second voltage limiting means is closer electrically to said third voltage limiting means, the second terminal of said third voltage limiting means being connected to the first terminal of said fourth voltage limiting means, the second terminal of said fourth voltage limiting means being connected to the anode terminal of said third diode, the junction between said third voltage limiting means and said series circuit which includes said fourth resistive element and said second voltage limiting means being maintained at substantially a first predetermined voltage, the junction between said third voltage limiting means and said fourth voltage limiting means being maintained at substantially a second predetermined voltage, said timing means comprising a third capacitive element having two terminals, a fifth resistive element, the resistance of said fifth resistive element being adapted to be varied, a fourth diode, said fourth diode having a cathode and anode, one terminal of said third capacitive element being connected to the junction between said third voltage limiting means and the series circuit which includes said second voltage limiting means and said fourth resistive element to thereby maintain the last-mentioned junction at said first substantially predetermined voltage, the other terminal of said third capacitive element being connected to said cathode of said fourth electrical diode and to one end of said fifth resistive element, the other end of said fifth resistive element and the anode of said fourth diode being connected to the anode of said third diode, said switch triggering means comprising two electrical valves each having an input terminal, an output terminal and a control terminal, fifth and sixth diodes, each of said fifth and sixth diodes having an anode and a cathode, fourth and fifth and sixth capacitive elements each having two terminals, sixth and eleventh resistive elements, said control terminal of said first electrical valve of said switch triggering means, the input terminal of said second electrical valve of said switch triggering means and one terminal of said fifth capacitive element being connected to the junction between said third capacitive element, said fifth resistive element and said cathode of said fourth diode, said cathode of said sixth diode being connected to the input terminal of said first electrical valve of said switch triggering means, said anode of said sixth diode and the other terminal of said fifth capacitive element being connected to the junction between said third and said fourth voltage limiting means to thereby maintain the last-mentioned junction at said second substantially predetermined voltage, the output terminal of said first electrical valve being connected to the control terminal of said second electrical valve of said switch triggering means and to one terminal of the parallel combination of said eleventh resistive element and said sixth capacitive element, the other end of said latter combination being connected to the anode of said third diode, the output terminal of said second electrical valve of said switch triggering means being connected to the anode of said fifth diode, the cathode of said fifth diode being connected to one terminal of said fourth capacitive element, to one terminal of said sixth resistive element and to the gate terminal of said static gated device, said first timing means discharge path comprises a seventh diode having an anode and cathode terminal and a seventh resistive element, said anode of said seventh diode being connected to the junction between one terminal of said third capacitive element, said fourth resistive element and said third voltage limiting means, said cathode of said seventh diode being connected to one end of said seventh resistive element, the other end of said seventh resistive element being connected to the junction between said third resistive element, said second capacitive element and said second voltage limiting means, said voltage divider means comprising eighth and ninth resistive elements, one end of said eighth resistive element being connected to one end of said ninth resistive element, the other end of said eighth resistive element being connected to the anode of said third diode, the other end of said ninth resistive element being connected to the cathode of said third diode and also to the negative terminal of said full wave bridge rectifier, said second timing means discharge path comprising a tenth resistive element, said voltage regulator means being energized when said input terminals of said full wave bridge rectifier means are connected to said electrical relay coil and said source of alternating current, by the flow of said sinusoidally shaped electrical current pulses from the positive terminal of said full wave bridge rectifier through said second and third resistive elements, through said series circuit which includes said fourth resistive element and said second voltage limiting means, through said third and fourth voltage limiting means, and through said third diode to the negative terminal of said bridge rectifier, said second substantially predetermined voltage being impressed upon said one input terminal of said switch triggering means, said timing circuit being adapted to apply said variable voltage to the control terminal of said first electrical valve of said switch triggering means when said bridge rectifier means is connected to said source with the potential difference between said control terminal and said input terminal of the said first electrical valve being initially at a value which prevents said first valve from conducting substantial electrical current from said first input terminal to said output terminal of said first valve, said variable voltage then changing, as said third capacitive element of said timing circuit charges, to a value which actuates said first electrical valve to conduct sufficient electrical current between said first input terminal and said output terminal of said first terminal valve and into the control terminal of said second electrical valve to actuate said second electrical valve to conduct electrical current from said input terminal to said output terminal of said second valve thus further lowering said voltage at the said control terminal of said first electrical valve to thereby actuate said first electrical valve to conduct more electrical current from said input terminal to said output terminal of said first valve until said first and second valves are in a saturated state, said flow of current energizing the gate of said static gated device, causing said gated device to conduct electrical current, said conduction of electrical current by said gated device energizing said first capacitive element so that when said electrical pulses from said full wave bridge rectifier are near zero value said second diode becomes reverse biased and charge from said first capacitive element flows into said static gated device to maintain it in a conducting state, through said second resistive element and said first voltage limiting means back to said first capacitive element, said voltage regulator means being substantially shorted by said conducting, static, gated device to thereby cause said third capacitive element to initially discharge through said seventh diode for the purpose of resetting said timing circuit, through said seventh and third resistive elements, through said conducting static gated device and said fourth electrical diode, the discharge of said third capacitive element continuing through said tenth resistive element and said ninth resistive element to the negative terminal of said full wave bridge rectifier whereupon said electrical coil remains energized until said source of alternating current is disconnected from said bridge rectifier means.

5. The combination as claimed in claim 4 wherein said first, second, third, fourth, fifth, sixth and seventh electrical diodes comprise solid state semiconductor diodes, said first, second, third, and fourth voltage limiting means comprise Zener diodes wherein each said first voltage limiting means terminal comprises a Zener diode cathode and each said second voltage limiting means terminal comprises a Zener diode anode, each said resistive element comprises a resistor, each said capacitive element comprises a capacitor, said static gated device comprises a thyristor, said first three-terminal electrical valve comprises a PNP semiconductor transistor where said input terminal comprises an emitter, said output terminal comprises a collector and said control terminal comprises a base, said second three terminal electrical valve comprises an NPN semiconductor transistor where said input terminal comprises a collector, said output terminal comprises an emitter and said control terminal comprises a base, and a switch is provided for the connection of said source of alternating current and said electric coil to said full wave bridge rectifier.

* * * * *